H. W. BURGESS & J. HEPWORTH.
ROCK DRILL.
APPLICATION FILED JULY 3, 1908.
937,048.
Patented Oct. 19, 1909.
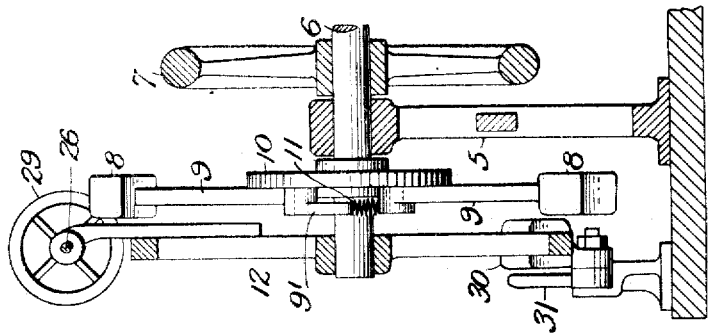
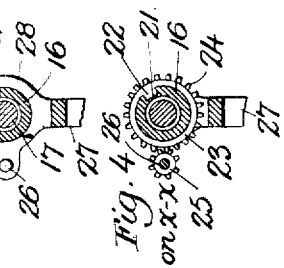
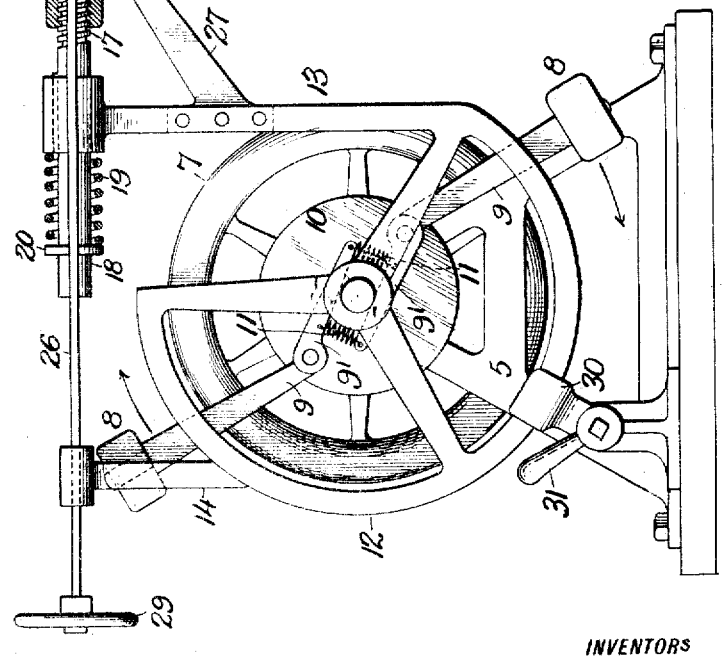
WITNESSES:
James F. Duhamel
F. B. Hoffman
INVENTORS
HYLA W. BURGESS,
JOSEPH HEPWORTH,
BY
Victor J. Evans
ATTORNEYS

UNITED STATES PATENT OFFICE.

HYLA W. BURGESS AND JOSEPH HEPWORTH, OF ALBION, IDAHO.

ROCK-DRILL.

937,048.   Specification of Letters Patent.   Patented Oct. 19, 1909.

Application filed July 3, 1908. Serial No. 441,800.

*To all whom it may concern:*

Be it known that we, HYLA W. BURGESS and JOSEPH HEPWORTH, citizens of the United States of America, residing at Albion, in the county of Cassia and State of Idaho, have invented new and useful Improvements in Rock-Drills, of which the following is a specification.

This invention relates to rock drills and more especially to that class where a blow is automatically delivered to the head of the drill by hammers which are rotated as will be more fully described in the following specification, set forth in the claims and illustrated in the drawings.

Figure 1 is a side elevation of the drill a part being shown in section. Fig. 2 is a vertical sectional view on the line in the shaft. Fig. 3 is a sectional view of the drill carrier on the line Y—Y. Fig. 4 is a similar sectional view on the line X—X.

The device is mounted on the standard 5, of sufficient strength and braced as shown in the drawings and in the upper end of this standard is a bearing in which is journaled a driving shaft 6. The shaft carries the balance wheel 7 at one side of the standard and a pulley or crank may also be secured to the shaft for the purpose of actuating the device. Secured to the shaft 6 is a disk 10 which carries pivoted hammers 8 and whose handles 9 are extended as arms 9' beyond the pivot and connected with each other by the springs 11 which normally hold the hammers in a position to deliver a blow but permit them to yield and fly backward after the blow is struck. At one end of the shaft is a frame 12 for uprights 13 and 14 the former of which is adapted to carry a drill 15. The drill is mounted in a chuck 16 which is adjustable by means of the screw thread 17 on the end of the head 18 and is normally held in its retracted position by means of the spring 19 encircling the head and confined between the flange 20 and the upright 13. The chuck 16 has a groove 21 in one side to receive the spline 22 of the ring 23 and the latter has gear teeth 24 with which meshes the pinion 25. The pinion 25 is at the outer end of a rod 26 supported by the upright 14 and an extension 27 of the upright 13 which also encircles the chuck and retains the ring 23 between its jaws 28. The other end of the rod 26 carries a hand-wheel 29 to rotate the pinion 25.

In order to direct the drill the angle to same is altered by shifting the frame 12 on the shaft 6 and when it reaches the desired point it is locked in position by means of the clamp 30 operated by a lever 31.

In operating the drill the shaft is rotated so as to carry the hammers in the direction of the arrows in Fig. 1, and as the hammers move they come in contact with the drill head 18. As the shaft rotates the hammers are permitted to yield through the tension of the springs 11 sufficiently to allow the hammer heads to pass beneath the lower edge of the head 18 and resume their normal position after passing beyond the influence of the springs 11. The handles of the hammers are each provided with a boss or enlargement at the point where the arm 9' is integrally connected thereto, and the pivot pin extends through a hole in said boss and is rigidly connected to the disk 10.

It is obvious that minor modifications may be made in the construction of the details of the device without departing from the essential features above described.

What we claim as new and desire to secure by Letters Patent is:

1. In a rock drill, the combination with a shaft, of an adjustable frame supported by same, a clamp on the base of the drill and adapted to hold the frame in adjustment, a chuck, a drill head with screw threads working in the chuck, a toothed ring splined on the chuck, a rod with a pinion operating the toothed ring and yielding hammers carried by the shaft and adapted to strike the drill head.

2. In a rock drill, the combination of a rotatable shaft, a disk on said shaft, a plurality of hammers, each having a head, a handle, an integral arm extending at an angle to said handle, and a boss at the point of junction of said handle and arm, a pivot pin extending through said boss and connected to said disk, springs connected to said arms on opposite sides of said shaft, and a drilling tool provided with a head disposed in the path of said hammer heads.

In testimony whereof we affix our signatures in presence of two witnesses.

HYLA W. BURGESS.
JOSEPH HEPWORTH.

Witnesses:
E. I. VREDENBURGH,
JOHN H. COOK.